United States Patent
Baumgartner (10) Patent No.: US 8,037,974 B2
(45) Date of Patent: Oct. 18, 2011

(54) SELF-ENERGIZING DISC BRAKE WITH BRAKE PAD STABILIZATION

(75) Inventor: Johann Baumgartner, Moosburg (DE)

(73) Assignee: KNORR-BREMSE Systeme fuer Nufzfahrzeuge GmbH, Munich (DE)

( * ) Notice: Subject to any disclaimer, the term of this patent is extended or adjusted under 35 U.S.C. 154(b) by 80 days.

(21) Appl. No.: 12/127,466

(22) Filed: May 27, 2008

(65) Prior Publication Data
US 2008/0264737 A1    Oct. 30, 2008

Related U.S. Application Data

(63) Continuation of application No. PCT/EP2006/011030, filed on Nov. 17, 2006.

(30) Foreign Application Priority Data

Nov. 24, 2005    (DE) .......................... 10 2005 056 064

(51) Int. Cl.
F16D 55/14    (2006.01)
(52) U.S. Cl. ...................... 188/72.2; 188/72.3; 188/72.8
(58) Field of Classification Search ................ 188/72.2, 188/72.3, 72.7, 72.8
See application file for complete search history.

(56) References Cited

U.S. PATENT DOCUMENTS

| | | | |
|---|---|---|---|
| 3,285,372 A | 11/1966 | Rossmann | |
| 5,582,273 A | 12/1996 | Baumgartner et al. | |
| 6,305,506 B1 * | 10/2001 | Shirai et al. | 188/72.2 |
| 6,374,958 B1 * | 4/2002 | Usui et al. | 188/72.7 |
| 6,899,204 B2 * | 5/2005 | Baumgartner et al. | 188/72.9 |
| 7,258,206 B2 * | 8/2007 | Severinsson | 188/72.7 |
| 2004/0060780 A1 * | 4/2004 | Boisseau et al. | 188/72.7 |
| 2005/0109566 A1 * | 5/2005 | Baumann et al. | 188/71.8 |
| 2005/0109567 A1 * | 5/2005 | Baumann et al. | 188/72.8 |
| 2005/0247527 A1 * | 11/2005 | Severinsson | 188/72.2 |
| 2006/0175163 A1 * | 8/2006 | Severinsson | 188/265 |
| 2008/0121472 A1 * | 5/2008 | Severinsson | 188/72.2 |
| 2008/0164105 A1 * | 7/2008 | Baumann et al. | 188/72.2 |
| 2008/0185240 A1 * | 8/2008 | Cao et al. | 188/72.2 |
| 2008/0210498 A1 * | 9/2008 | Baumgartner et al. | 188/72.2 |
| 2008/0296102 A1 * | 12/2008 | Cao et al. | 188/72.2 |
| 2009/0045018 A1 * | 2/2009 | Baumgartner et al. | 188/72.2 |

(Continued)

FOREIGN PATENT DOCUMENTS

DE    37 16 202 A1    11/1988

(Continued)

OTHER PUBLICATIONS

International Search Report dated Feb. 15, 2007 with English translation (Six (6) Pages).

*Primary Examiner* — Bradley King
*Assistant Examiner* — Thomas Irvin
(74) *Attorney, Agent, or Firm* — Crowell & Moring LLP (57) ABSTRACT

A self-energizing disc brake includes a brake caliper or frame, the application device for applying at least one brake at least one brake pad unit, and at least one electromotive drive as an actuator for actuating the application device. The application device also has two or more brake plungers, wherein the two brake plungers are connected to one another by a connecting plate. At least one or more ramp arrangements is/are formed in the region adjacent to the brake plungers between the brake pad unit and the connecting plate.

18 Claims, 4 Drawing Sheets

U.S. PATENT DOCUMENTS

2009/0194377 A1 * 8/2009 Baumgartner et al. ...... 188/72.2

FOREIGN PATENT DOCUMENTS

| DE | 101 64 317 C1 | 10/2003 |
| DE | 103 19 082 B3 | 12/2004 |
| DE | 103 36 284 A1 | 3/2005 |
| EP | 0 688 404 B1 | 12/1995 |
| WO | WO 02/14708 A2 | 2/2002 |
| WO | WO 03/071150 A1 | 8/2003 |
| WO | WO 2005015046 A1 * | 2/2005 |
| WO | WO 2005/064195 A1 | 7/2005 |
| WO | WO 2006/040006 A1 | 4/2006 |

* cited by examiner

SELF-ENERGIZING DISC BRAKE WITH BRAKE PAD STABILIZATION

CROSS-REFERENCE TO RELATED APPLICATIONS

This application is a continuation of PCT International Application No. PCT/EP2006/011030, filed Nov. 17, 2006, which claims priority under 35 U.S.C. §119 to German Application No. 10 2005 056 064.4, filed Nov. 24, 2005, the entire disclosures of which are expressly incorporated by reference herein.

BACKGROUND AND SUMMARY OF THE INVENTION

The invention relates to a self-energizing disc brake.

Self-energizing brakes—also with an electromechanical actuator—are known in various embodiments. The majority of the known brakes, however, describe operating principles which, although they permit self-energizing, are unsuitable for realizing a production-ready, economically producible, disc brake for heavy utility vehicles, particularly on account of their cumbersome structural design.

It is therefore a basic problem with self-energizing disc brakes for utility vehicles trying to realize an efficient radial stabilization, in particular of the application-side brake pad in a structurally simple manner. Since the two pressure spindles of utility vehicle brakes are arranged offset with respect to one another in the peripheral direction or tangentially, the arrangement is efficiently stabilized against peripheral oblique wear. In the radial direction with respect to the brake disc rotational axis, however, there is no aligning action or at least only a very small amount of aligning action. In particular, when using balls as rolling bodies between the application-side brake pad and the pressure spindles, it is conceivable for the brake pad to begin to oscillate, at least in the event of non-optimum alignment, in the non-actuated state of the brake, which can cause said brake pad to constantly run against the brake disc, which can in turn result in undefined wear of the pad and/or disc.

In the same way, radial oblique wear, which is generated during braking processes can progress unhindered. The result is early wear of the brake pad, which can entail unnecessarily high service costs and vehicle down-time periods, in particular where the disc brake is designed for heavy utility or commercial vehicles.

For this reason, in order to generate a sufficient alignment action, it has already been proposed in the prior art to provide further application points in a disc brake in addition to the long-known arrangement of two application points or pressure spindles (such an arrangement is already known per se for example, from pneumatically actuated disc brakes). Such a proposal is disclosed, for example, in DE 103 36 284 A1.

In commercial vehicle brakes, however, the arrangement for example of a third pressure spindle is very complex on account of the necessary wear adjustment and also cannot be realized, or can be realized only with difficulty, due to space constraints.

Against this background, the present invention seeks to obtain efficient radial stabilization of the application-side brake pad for self-energizing disc brakes using structurally simple measures.

According to the invention, the two pressure spindles or brake plungers are connected to one another via a connecting plate, with at least one or more ramp arrangements being formed in the region adjacent to the brake plungers between the brake pad, or a brake pad unit composed of a brake pad and an additional pressure plate, and the connecting plate.

Pad lining stabilization in the radial direction too can be obtained in a simple manner by way of the at least one or more ramp arrangements, as an extension of the brake plunger, between the brake pad (or a brake pad unit which comprises the brake pad and, if appropriate, a pressure plate or the like) and the connecting plate.

Here, in each case, one ramp/rolling-body arrangement is particularly preferably also formed between the brake plungers and the brake pad unit. Each of the pressure surfaces of the at least two or more brake plungers is particularly preferably also provided on its side facing toward the brake pad unit with a recess having a ramp-shaped contour into which engages, in each case, one rolling body which is supported at one side against the ramp-shaped contour of the pressure surfaces of the brake plunger and at the other side against the brake pad unit.

The ramp/rolling-body arrangements between the brake plungers and the brake lining unit serve to transmit and support the brake force. The ramp/rolling-body arrangements are, therefore, referred to below as "primary ramp/rolling-body arrangements".

In contrast, the ramp arrangements between the brake pad and the connecting plate are referred to as "secondary ramp/rolling-body arrangements".

By means of the "primary ramp/rolling-body arrangements", the self-energizing brake is combined in a simple manner with an adjusting device. The application of the brake in the direction of the brake disc (or perpendicularly with respect to the brake disc) takes place by way of the brake plunger by virtue of the length of the latter being varied axially. The application in the peripheral direction or parallel to the disc takes place in a different way, for example way by way of a crank. The brake plungers can also be co-utilized for adjusting brake pad wear. There are, advantageously, an extremely wide variety of options during braking operations, which are explained in more detail below.

It is expedient if the connecting plate is composed of a metal plate. Other materials are contemplated, since the connecting plate serves not to transmit the significant braking forces but rather to stabilize the arrangement.

It is expedient that the connecting plate has two openings for the two brake plungers, and that the connecting plate is fixed to the brake plungers in order to move synchronously with the latter parallel to the brake disc rotational axis during application and adjustment movements.

A further opening is preferably formed in the connecting plate, through which further opening extends an electromotively driven crank pin for moving the brake pad unit. Other types of drive for the brake pad unit are also possible. For example, a linear drive may be used with a substantially analogous arrangement. Here, instead of the crank pin, a gearwheel segment is placed onto the drive shaft, which gearwheel segment engages into a toothed rack on the lining rear side (not illustrated here). However, a non-linear drive is preferably used. Also possible are lever arrangements operating as an application device between the electric motor and the brake pad unit (not illustrated here).

The ramp arrangements particularly preferably have, in each case, one recess in the connecting plate and one corresponding recess in the brake pad unit, into which recess a rolling body engages.

Here, it is expedient if one or, in each case, both of the recesses in the connecting plate or brake pad have a ramp-shaped contour, which runs obliquely with respect to the brake disc friction surface. The self-energizing action can be realized by way of the ramp-shaped contours, which run obliquely with respect to the brake disc friction surface, in interaction with the ramps on the brake plungers, since the rolling bodies run on the plungers during braking. The significant forces are absorbed by the brake plunger. The ramps in the connecting plate have primarily a stabilizing effect.

It is expedient if one or, in each case, both of the recesses in the connecting plate or brake pad have a geometry which is matched to the rolling body geometry.

The rolling bodies between the connecting plate and the brake pad unit are preferably composed of metal. It is also contemplated for the rolling bodies to be composed of metal, ceramic, glass or plastic since the rolling bodies need absorb only low forces.

It is expedient if the recesses in the brake pad unit and/or in the connecting plate are formed as groove-shaped raceways.

For braking operations when traveling forward and when traveling backward, and for braking operations when parking, it is also advantageous if the recesses are embodied in the form of dual-direction ramps.

The adjustable ramp system can also be utilized in order to realize a reliable parking brake, which also automatically adjusts in the event of friction bodies shrinking as a result of cooling. A further significant advantage of the invention is, therefore, also to be considered that of a reliably operating parking brake without additional actuating components being necessary.

For this purpose, the ramp angle with the greatest degree of self-energizing must be dimensioned such that self-energizing is possible even with the lowest contemplated lining friction value.

The control of the electromechanical brake takes place in each case by way of one or more processor units on the brake, which processor units are, if appropriate, networked, or for example by way of a superordinate processor on the vehicle for one or more brakes.

If normal force regulation, for example, is carried out, which is not considered to be usable as sole regulation according to the prior art, it is advantageous that, for example by way of the support of the brake plunger on the brake caliper, the normal force can be determined very precisely (force parallel to the longitudinal axis of the brake plunger), for example by virtue of corresponding sensors being arranged on the brake plungers and/or adjoining elements.

In each case, one ramp arrangement is preferably likewise formed between the brake plungers and the brake lining unit.

Not only is it contemplated for the ramp arrangement to be embodied as a ramp/rolling-body arrangement, the ramp arrangement can also be embodied as a particularly cost-effective ramp/cam arrangement. Instead of the rolling body, the more cost-effective cam—for example an embossed portion of the connecting plate—then slides on a ramp.

Other objects, advantages and novel features of the present invention will become apparent from the following detailed description when considered in conjunction with the accompanying drawings.

BRIEF DESCRIPTION OF THE DRAWINGS

FIGS. 2(a)-(d) show a section through the region of an application-side brake pad unit of a disc brake according to the invention and details which show the variants of a partial region of the view of FIG. 2a;

DETAILED DESCRIPTION OF THE DRAWINGS

The disc brakes according to the invention are preferably based on a fixed-caliper design, in which a single-part or multi-part caliper 1 (also referred to as a brake housing) is fastened to a wheel axle so as to be immovable relative to a brake disc 2.

The operational principle and the described features can, in principle, also be used for other brake types, such as sliding-caliper or pivoting-caliper brakes. Only the caliper head, which contains the brake actuating mechanism, of the mechanically/pneumatically actuated basic brake is replaced by the electromechanical application device with self-energization.

A fixed-caliper brake with a pneumatically actuated application device of this type is presented, for example, in DE 36 10 569 A1, DE 37 16 202 A1 or EP 0 688 404 A1. A fixed-caliper brake with electromotive adjustment is presented in WO 02/14 708 A1. One or more electromotive adjusting devices can be arranged in the proposed exemplary embodiments —if desired —in each case at the reaction side. Fixed-caliper designs with a small movement travel for the brake disc can be realized in a simple manner in this way. The invention therefore also creates, in a simple manner, a disc brake which is embodied, for example as shown in FIG. 1, as a fixed caliper brake having one or two electromechanical adjusting devices 52 on the reaction side 51 of the brake, and an electromechanical application device, preferably of self-energizing type, on the application side as illustrated within caliper 1.

Figure 1:
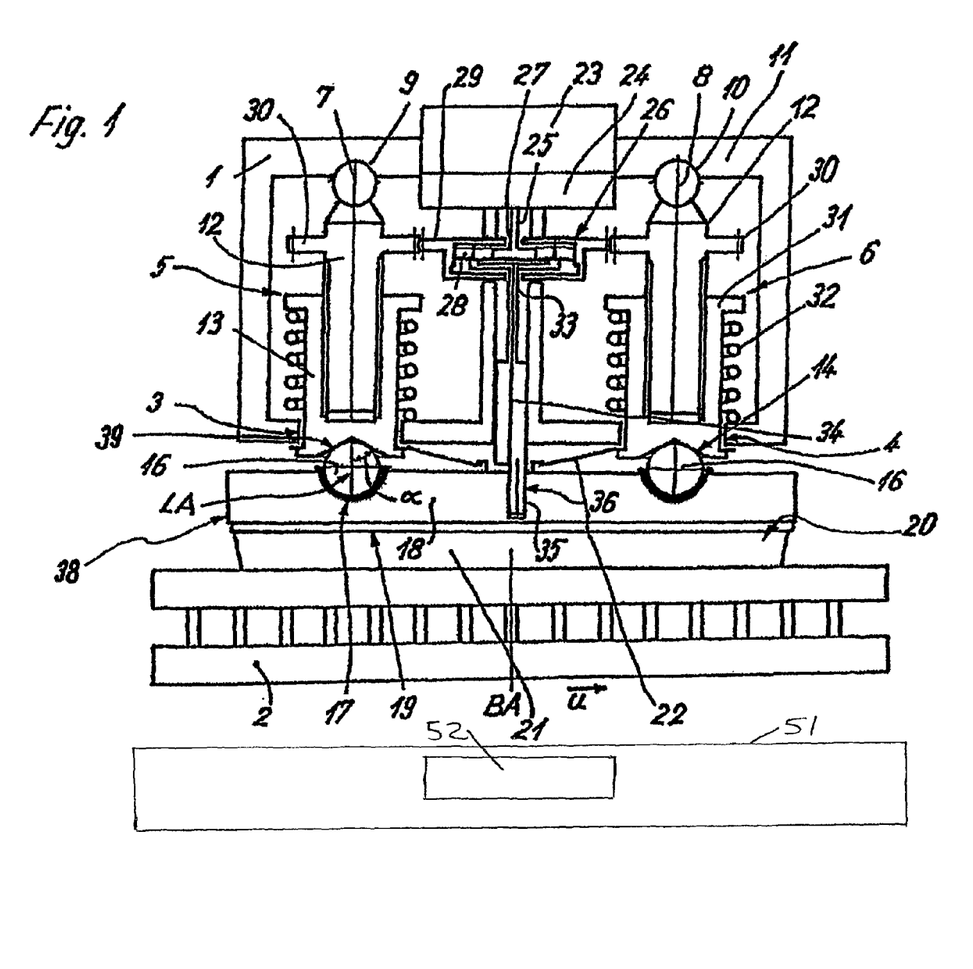
FIG. 1 shows a sketch illustrating the basic construction of a self-energizing disc brake.

FIG. 1 shows the caliper 1 only in its application-side region. In practice, the caliper 1 preferably engages in the manner of a frame around an upper peripheral region of the brake disc and is fastened in an immovable manner to a vehicle axle flange (not shown here).

The caliper 1 has, on its side facing toward the brake disc 2 having a brake disc rotational axis BA, one or more, preferably two, openings 3, 4 and a corresponding number of brake plungers (spindles) 5, 6 (in this case two), which are aligned parallel to the brake disc axis BA.

In FIGS. 1 to 4, in each case, two brake plungers 5, 6 are arranged parallel to one another.

The two brake plungers 5, 6 or adjusting spindles are supported in each case directly or via interposed elements, in this case plain bearing shells 9, 10, against the rear wall 11, which faces away from the brake disc, of the caliper. Balls 7, 8 with plain bearing shells 9 are preferably used as bearings. The bearings are designed so as to permit a rotation of the brake plungers 5, 6 or adjusting spindles about their own longitudinal axis LA.

Here, spherical-segment-shaped (spherical-cap-shaped) recesses are formed in each case in the brake plunger 5, 6 and in the caliper, into one of which recesses (in this case those in the caliper) the plain bearing shells 9, 10 are inserted, such that the balls 7, 8 can rotate relative to the plain bearing shell.

Alternatively, the balls 7, 8 can also be formed as spherical extensions on the ends, which face toward the brake caliper, of the brake plungers 5, 6 (not illustrated here), which spherical extensions then engage into corresponding recesses in the brake caliper with plain bearing shells. Planar plain bearings or annular bearings or the like (not illustrated here) may also be utilized instead of the balls and recesses.

The brake plungers 5, 6 have, in each case, one spindle 12 which is provided with an external thread and on which a sleeve-like nut 13 having a corresponding inner thread is arranged in a rotatable manner. The thread can be non-self-locking or self-locking depending on the design.

The nuts 13 have, at their side facing away from the brake disc, a flange 31, with pressure springs 32 acting here in each case between the flange 31 and an inner wall of the caliper 1, which pressure springs 32 concentrically surround the nut 13 and exert a predefined force on the flange or preload the flange 31 relative to the caliper inner wall. Alternatively, the entire mechanism is braced against the pressure plate.

In FIGS. 1 to 4, the nut 13 of each brake plunger 5, 6 is arranged on the side facing away from the brake disc and the spindle 12 is arranged on the side facing toward the caliper interior. A reverse arrangement would also be possible (not illustrated here).

By screwing the nut 13 on the spindle 12, it is possible to adjust the axial length of each individual brake plunger 5, 6 which is formed in this way, for example in order to compensate brake pad wear and when applying the pads to the brake disc 2.

At its side facing toward the brake disc, that is to say on its pressure surfaces, the brake plungers 5, 6 (in this case the nuts 13) are in each case provided with a ramp-like recess or contour 14 (ramp) whose lowest point is preferably in the region of the longitudinal axis LA of the brake plungers. Rolling bodies 16, which are in this case designed as balls 16 in a preferred embodiment, engage in each case into the recesses 14. The lowest point of the recesses 14 is in each case advantageously designed such that the rolling bodies 16, in particular balls, are latched at the lowest point and can be released from the depression only counter to a minimum latching force, which ensures a defined rest state.

Alternatively, according to an alternative embodiment, cylindrical rolling bodies or rolling bodies of some other shape (for example barrels) would, for example, also be possible, which rolling bodies would then roll for example on a groove-like recess in the brake plungers.

The rolling bodies 16 engage, at their sides facing away from the brake disc, into plain bearing shells 17, which are in each case formed according to the design of the rolling bodies and which are in this case spherical-cap-shaped. The plain bearing shells 17 are inserted into recesses of a corresponding shape in a pressure plate 18, which bears against the carrier plate 19 of an application-side brake pad 20 with brake pad lining material 21, which brake pad 20 is arranged in the brake caliper 1 so as to be movable parallel to the brake disc rotational axis BA and in the peripheral direction U (or tangentially or parallel to the tangential line) relative to the brake disc 2.

A clamp spring 22 between the pressure plate 18 and nuts 13 holds the pressure plate 18 under preload against the nuts 13. It is alternatively also contemplated for the pressure plate to be braced against the housing (caliper) in some other way.

An electric drive motor 23 serves to drive the brake, downstream of which drive motor 23 is preferably arranged a step-down gearing 24 whose drive output shaft 25 acts on a further gearing 26, in particular a planetary gear set, which is arranged centrally between the spindles.

Here, the drive output shaft 25 drives a sun gear 27 of the planetary gear set 26, which sun gear 27 drives planet gears 28. The planet gears 28 mesh (not illustrated in detail here) with the sun gear 27 and an internally and externally toothed ring 29. Depending on the switching state (capacity for switching not illustrated here), the planet gears 28 set either the planet carrier 33 or the ring 29 in rotation. The ring 29 meshes with its external toothing with gearwheels 30 which are placed on spindles 12 or are integrally formed on the spindles 12.

For the automatic switching of the drive (for example, an electric motor), it is possible to provide a spring-loaded ball latch mechanism (not illustrated here). The switching process can also be realized in some other way (for example, electromagnetically).

Here, a cylindrical crank 34, which is arranged parallel to the brake disc axis, is provided as an axial extension of the planet carrier 33, which crank 34 engages at its side facing toward the brake disc 2 with an eccentric crank pin 35, which is likewise aligned parallel to the brake disc axis BA, into a corresponding opening 36 in a brake pad unit, with the opening 36 having a cross section which, for example, corresponds to the cross section of the crank pin 35 or else is formed in the manner of a slotted guide, in particular a slotted hole (in this case, for example perpendicular to the plane of the drawing).

In the exemplary embodiment of FIG. 1, the actuating device or application device is composed of the two adjusting spindles or brake plungers 5, 6 which are variable in length for the purpose of wear adjustment and which have, in their pressure surface facing toward the brake disc 2, the recesses 14 in the manner of ramp contours on which the rolling bodies 16 run. The rolling bodies 16 transmit the application force generated by the brake to the brake pad unit or to the pressure plate, which bears against the brake pad.

In the pressure surface of the brake pad unit or of the pressure plate 18, the rolling bodies 16 are held in an inversely-designed frame profile (not illustrated here) or (preferably, since the rolling bodies are guided in a particularly secure manner; illustrated here) in the plain bearing bed (plain bearing shells 17).

The brake pad unit 38, composed in this case of the single-part or multi-part combination of brake pad 20 and pressure plate 18, is pressed resiliently against the brake plungers 5, 6 such that the rolling bodies 16 arranged in between are braced elastically between the brake pad unit and the brake plungers.

The actuation of the brake takes place, after an application of the brake pad 20 to the brake disc, by means of a movement of the pressure plate together with the brake pad 20 parallel to the friction surface of the brake disc in the rotational direction or peripheral direction thereof.

The movement is preferably brought about by way of the crank drive 35, 36 which, with a drive-output- and crank pin 35, engages approximately centrally on the pressure plate 18 of the brake pad unit 18, 20 and is mounted parallel to the rotational axis of the brake disc in the caliper 1.

The actuation of the crank drive takes place by via the electric drive, for example the electric motor 23, with a gearing 24 positioned downstream.

FIG. 1 is characterized by a constant ramp angle $\alpha > 0°$ of the ramps relative to the brake disc friction surface. A particularly simple structural design is obtained in this way, which is distinguished by a robust construction, good functional reliability, and low production costs. It is possible in particular for an electric motor 23 with an extremely low output power to be used. Here, the balls 16 are cost-effective rolling bodies, which are virtually self-aligning in the ramp surface. In order to increase the load capacity, it is also possible for the balls to roll in adapted running grooves. A variant with rollers as rolling bodies 16 would, in contrast, have a particularly low level of hysteresis (not illustrated here).

Also contemplated are variants in which the ramp angle of the recesses 14 is not constant, but rather variable in the peripheral direction about the longitudinal axis of the adjusting nuts or brake plungers 5, 6, such that a ramp angle $\alpha$ of varying gradient is present depending on the rotational position of the nuts 13. For this purpose, ball running grooves with different gradients can be arranged for the different rotational positions (not illustrated here).

During braking operations, the brake pads 20 move with a movement component in the peripheral direction or parallel to the brake disc friction surface.

Here, the rolling bodies 14 roll upwards on the ramp surfaces of the recesses 14 (the ramps 39) and thereby move the brake pad or in this case the brake pad unit against the brake disc. The braking effect is brought about by the pressure force generated here. Here, the peripheral movement can be brought about exclusively as a result of the friction force or can be additionally influenced by an actuating element (see also FIG. 4 as a basic sketch).

Figure 2:
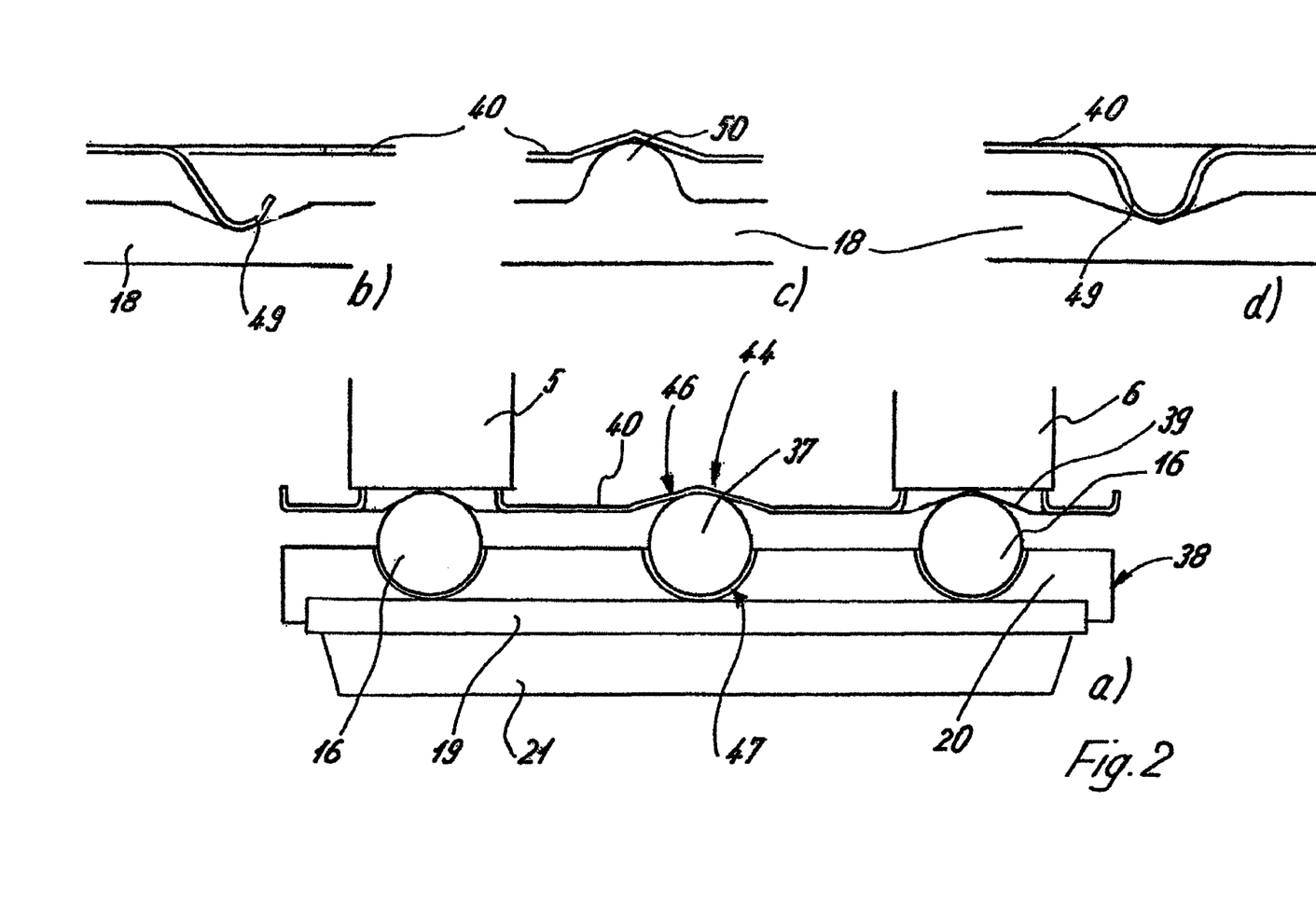

The self-energizing disc brake of FIG. 1 is robust and reliable and obtains a high degree of self-energization using simple measures. FIG. 2 expands the construction by a measure for the efficient radial stabilization of the brake lining.

According to FIG. 2, the two pressure spindles or brake plungers 5, 6 are connected to one another via a connecting plate 40 through which the brake plungers 5, 6 extend in each case with their end regions in which the ramp-shaped recesses are formed.

The connecting plate 40 is, preferably, composed of a thin metal plate. The connecting plate 40 has (see also FIG. 3) two openings 41, 42 for the two brake plungers 5, 6, to which brake plungers 5, 6 the connecting plate 40 can be fixed in order to move synchronously with them parallel to the brake disc rotational axis during application and adjusting movements.

Figure 3:
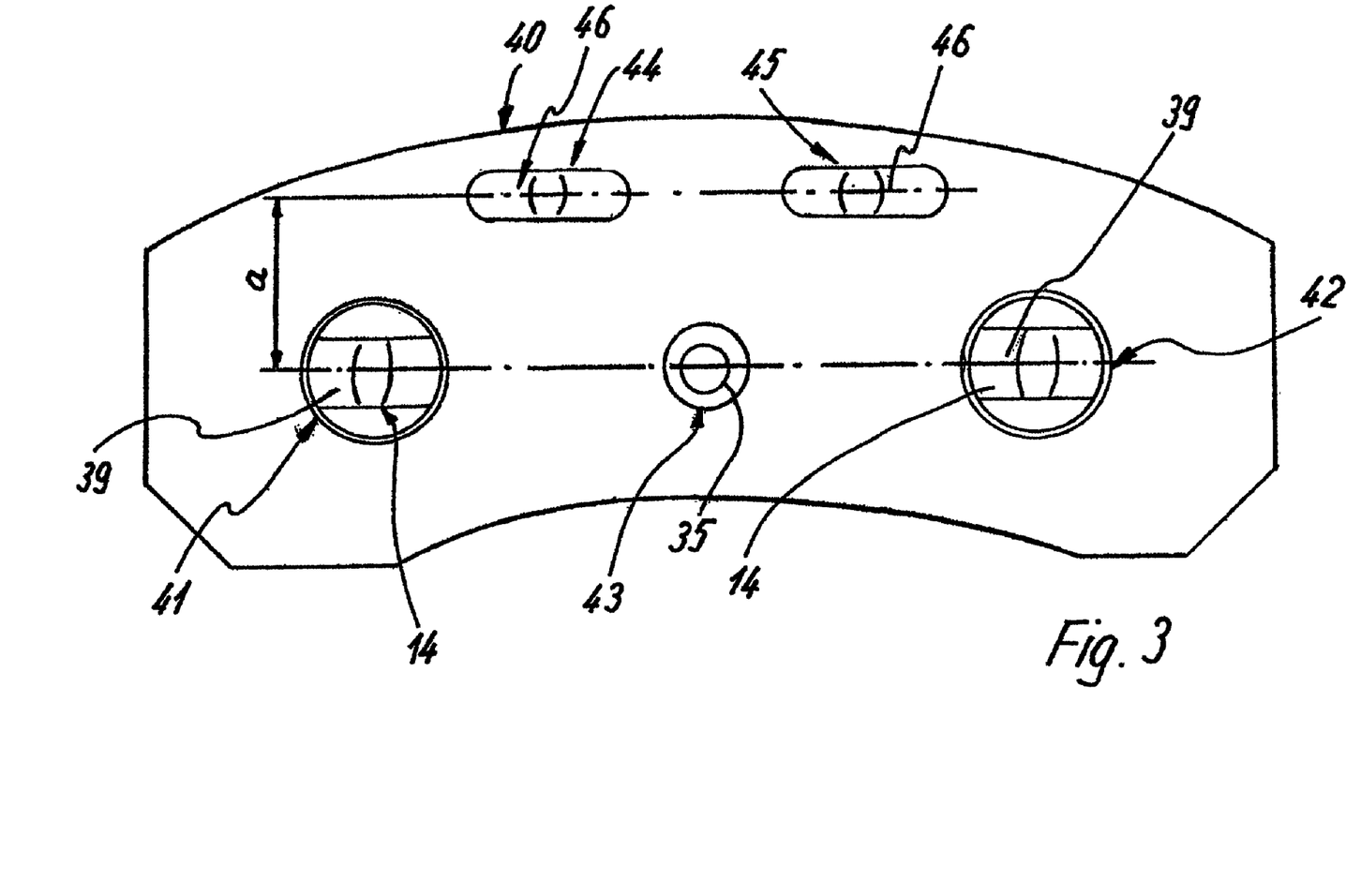
FIG. 3 shows a view of a connecting plate.
Figure 4:
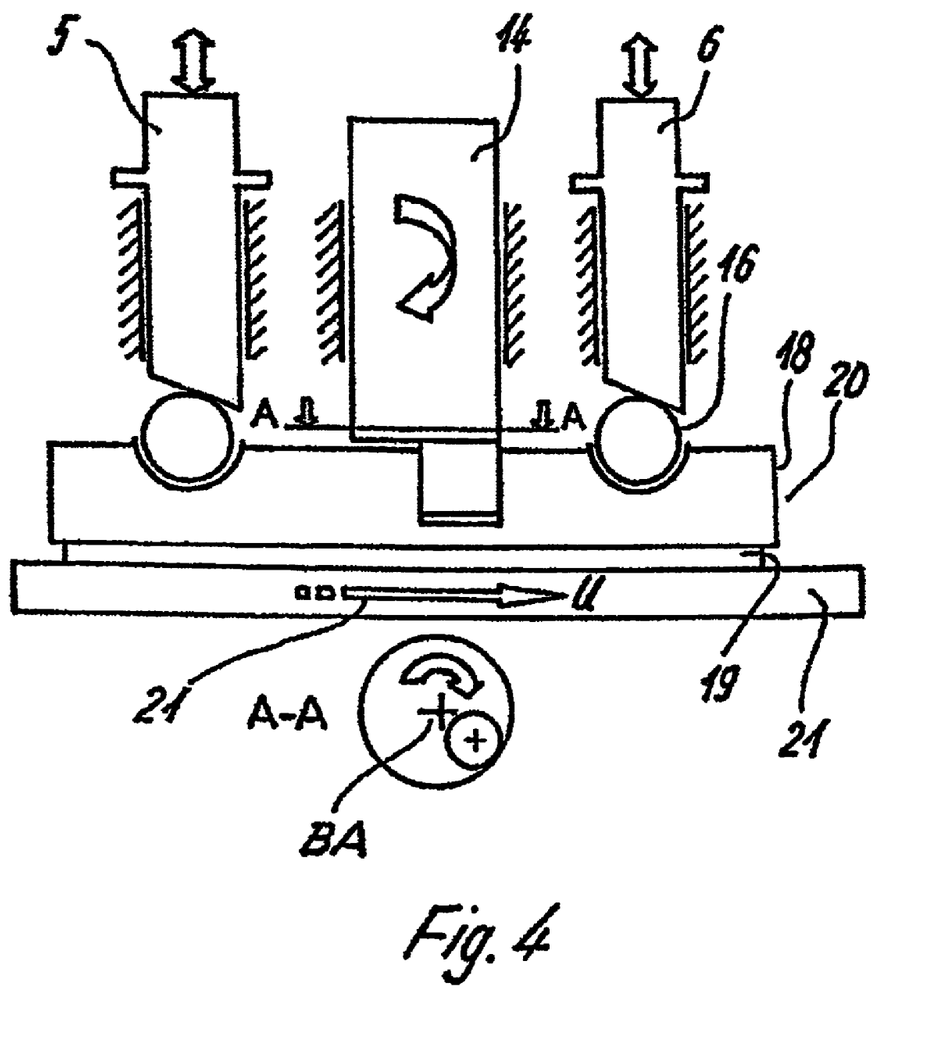
FIG. 4 shows a further sketch for illustrating the basic function of the disc brake of FIG. 1.

In the assembled state, the crank pin 35 extends through a further opening 43 in the plate 40 between the two openings 41, 42.

According to the invention, the problem of radially stabilizing the brake pad 20 or the brake pad unit 38 is solved in that at least one or more further ramp arrangements 44 are arranged between the brake pad unit 38 and the connecting plate 40, which ramp arrangements are embodied, according to one variant, as ramp/rolling-body arrangements 44 (FIG. 2a).

Instead of the rolling bodies, a ramp arrangement with cams 50 (formed for example so as to be of hemispherical shape or as spring elements 49) which slide on corresponding ramps 48 (FIGS. 2b-d may be used). Depending on the requirements, the ramps 48 are arranged on the connecting plate 40 or on the brake pad unit and, correspondingly, the cams 50 are arranged on the respective other component. Such an arrangement is particularly cost-effective and is also easy to assemble since the additional rolling bodies are dispensed with. The cams assume the guidance. The occurring friction is low and such a simplified variant is made realizable in the first instance because only low stabilization forces, but not the significant braking forces, are transmitted to the secondary ramps. The cams could for example in the simplest case be realized by use of embossed portions in the connecting plate.

One of the ramp/rolling-body arrangements 44, 45 is provided in FIG. 2 and, by way of example, two of the ramp-rolling body arrangements 44, 45 are provided in FIG. 3.

The ramp/rolling-body arrangements 44, 45 are formed in that at least one or more—in this case two—recesses 46 are also formed in addition to the openings 41-43 in the connecting plate, the contour of which ramp/rolling-body arrangements 44, 45, on the side facing toward the pad 20, preferably corresponds substantially or entirely to the contour of the recesses 14 in the brake plungers. Rolling bodies 37 are inserted into the recesses 46 in FIG. 2a, which rolling bodies 37 also engage into recesses 47 in the brake pad unit 39 (which can also be designed in the manner of ramps).

The further ramp/rolling-body arrangements 44, 45 ensure good radial stabilization. Their optimum position can, for example, be determined by testing.

On account of the relatively thin-walled design of the connecting plate 40, the "secondary ramp/rolling-body arrangements" cannot transmit high braking forces. They can therefore also be dimensioned to be smaller than the primary ramp/rolling-body arrangements in the brake plungers 5, 6.

It is therefore not strictly necessary to embed the rolling bodies 37 in the lining in plain bearing shells. It is alternatively possible for ramps to also (or only) be provided in the brake pad unit 39, and for the rolling bodies 37 in the connecting plate 40 to be fixed in some other suitable way, for example in a spherical-cap-shaped recess.

The relatively low forces to be transmitted also permit the use of a less stiff material for the rolling bodies 37. Rolling bodies 37 composed of metal, ceramic, glass or plastic may therefore be used. Use is particularly preferably made of corrosion-resistant materials, which make it possible for the "secondary ramp/rolling-body arrangements" to be arranged without sealing for preventing corrosion.

| Table of Reference symbols | |
|---|---|
| Caliper | 1 |
| Brake disc | 2 |
| Openings | 3, 4 |
| Brake plunger | 5, 6 |
| Bearing balls | 7, 8 |
| Plain bearing shells | 9, 10 |
| Rear wall | 11 |
| Spindle | 12 |
| Nut | 13 |
| Ramp-shaped recess | 14 |
| Rolling bodies | 16 |
| Plain bearing shells | 17 |
| Recesses | 15 |
| Pressure plate | 18 |
| Carrier plate | 19 |
| Brake pad | 20 |
| Brake pad material | 21 |
| Clamp spring | 22 |
| Drive motor | 23 |
| Step-down gearing | 24 |
| Drive output shaft | 25 |
| Gearing | 26 |
| Sun gear | 27 |
| Planet gears | 28 |
| Ring | 29 |
| Gearwheels | 30 |
| Flange | 31 |
| Pressure springs | 32 |
| Planet carrier | 33 |
| Crank | 34 |
| Crank pin | 35 |
| Opening | 36 |
| Rolling bodies | 37 |
| Brake pad unit | 38 |
| Ramps | 39 |
| Connecting plate | 40 |
| Opening | 41, 42, 43 |
| Ramp/rolling-body arrangements | 44, 45 |
| Recesses | 46, 47 |
| Ramps | 48 |
| Spring elements | 49 |
| Cam | 50 |
| Ramp angle | α |
| Longitudinal axis | LA |
| Peripheral direction | U |
| Brake disc axis | BA |

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A self-energizing disc brake having a brake disc, comprising:
   a caliper;
   a brake application device for applying at least one brake pad unit against a side of the brake disc via an application movement of the brake pad unit with respect to the brake disc, said application movement comprising at least one movement component that is parallel to a brake disc rotational axis and at least one movement component that is in a direction perpendicular to the brake disc rotational axis;
   a drive unit operatively configured to actuate the brake application device for applying the at least one brake pad unit;
   wherein the brake application device comprises at least two brake plungers that act on the brake pad unit, each plunger having an end region facing the brake pad unit, in which end region a ramp-shaped recess is formed;
   a connecting plate for connecting the two brake plungers, the two brake plungers extending through openings in the connecting plate;
   ramp/rolling-body arrangements being formed, respectively, between the end regions of the two brake plungers and the brake pad unit; and
   at least one additional ramp arrangement being located in a region adjacent to the two brake plungers and formed with the brake pad unit and the connecting plate.

2. The disc brake as claimed in claim 1, wherein the additional ramp arrangement in the region adjacent to the two brake plungers is a ramp/rolling-body arrangement.

3. The disc brake as claimed in claim 1, wherein the additional ramp arrangement in the region adjacent to the brake plungers is a ramp/cam arrangement.

4. The disc brake as claimed in claim 3, wherein the ramp/cam arrangement comprises a cam, which slides on a ramp.

5. The disc brake as claimed in claim 4, wherein the cam is a spring element.

6. The disc brake as claimed in claim 1, wherein the connecting plate is a metal plate.

7. The disc brake as claimed in claim 1, wherein the two brake plungers are supported on the caliper and are operatively configured to be axially variable in length.

8. The disc brake as claimed in claim 7, wherein the connecting plate is fixed to the two brake plungers in order to move synchronously with the plungers during application and adjustment movements of the disc brake.

9. The disc brake as claimed in claim 1, wherein a further opening is formed in the connecting plate, through which further opening extends a driven crank pin for moving the brake pad unit.

10. The disc brake as claimed in claim 2, wherein the ramp/rolling-body arrangements have, in each case, one recess in the connecting plate and one corresponding recess in the brake pad unit, into which recess in each case one rolling body engages.

11. The disc brake as claimed in claim 10, wherein one or both of the recesses in the connecting plate or in the brake pad unit have a ramp-shaped contour, which is aligned obliquely with respect to a friction surface of the brake disc.

12. The disc brake as claimed in claim 10, wherein one or both of the recesses in the connecting plate or brake pad have a geometry matched to the rolling body geometry.

13. The disc brake as claimed in claim 10, wherein the recesses in the brake pad unit and/or in the connecting plate are formed as groove-shaped raceways.

14. The disc brake as claimed in claim 2, wherein rolling bodies or the rolling body arrangement are composed of one of metal, ceramic, glass, or plastic.

15. The disc brake as claimed in claim 1, wherein the recesses are embodied as dual-direction ramps or conical surfaces.

16. The disc brake as claimed in claim 1, wherein the disc brake is a fixed-caliper brake having one or more electromechanical adjusting devices on a reaction side, which reaction side is situated on an opposite side of the brake disc from the brake application device.

17. The disc brake as claimed in claim 1, wherein the brake plungers are pressure plungers.

18. The disc brake as claimed in claim 1, wherein the brake pad unit is composed of a brake pad and a pressure plate.

* * * * *